Aug. 7, 1956   R. E. J. NORDQUIST ET AL   2,757,634
CONTAINER COATING MACHINE
Filed Oct. 30, 1953   6 Sheets-Sheet 4
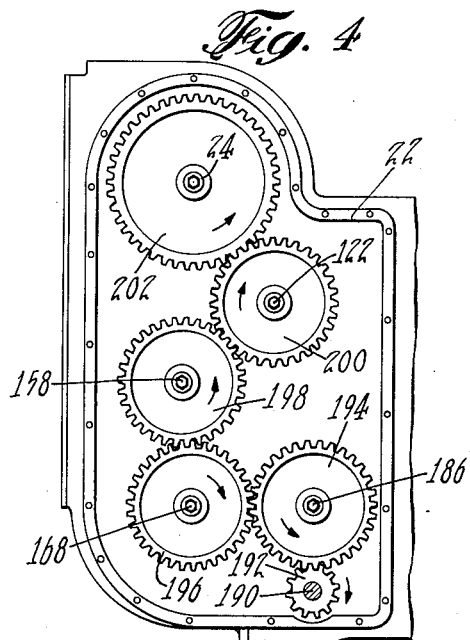
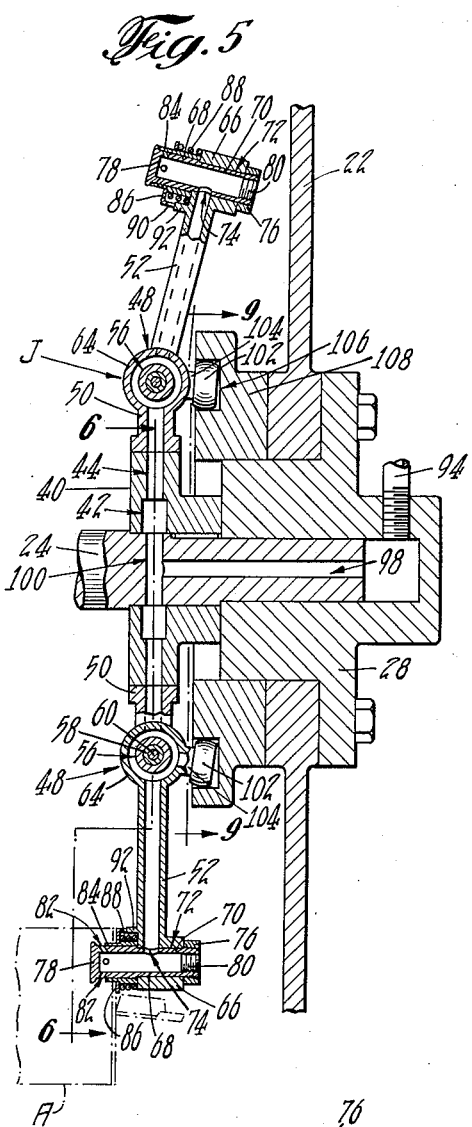
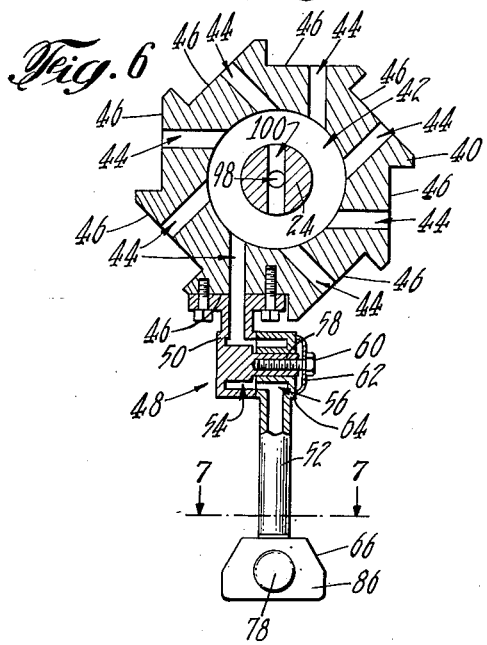
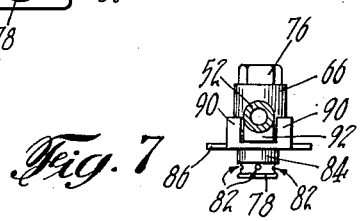
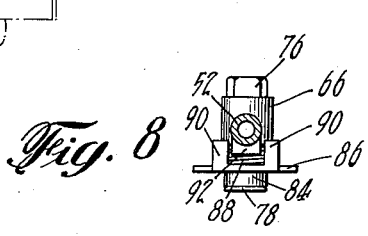
INVENTORS
RONALD E. J. NORDQUIST
WILLIAM B. HOMMEL
BY Charles H. Ewe
Leland R. McCann
George W. Reiber
ATTORNEYS Aug. 7, 1956  R. E. J. NORDQUIST ET AL  2,757,634
CONTAINER COATING MACHINE
Filed Oct. 30, 1953  6 Sheets—Sheet 5
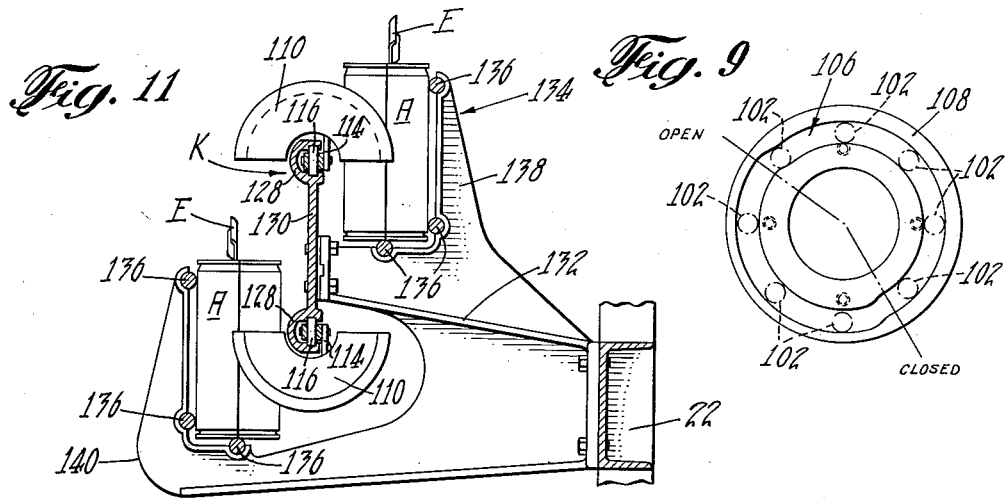
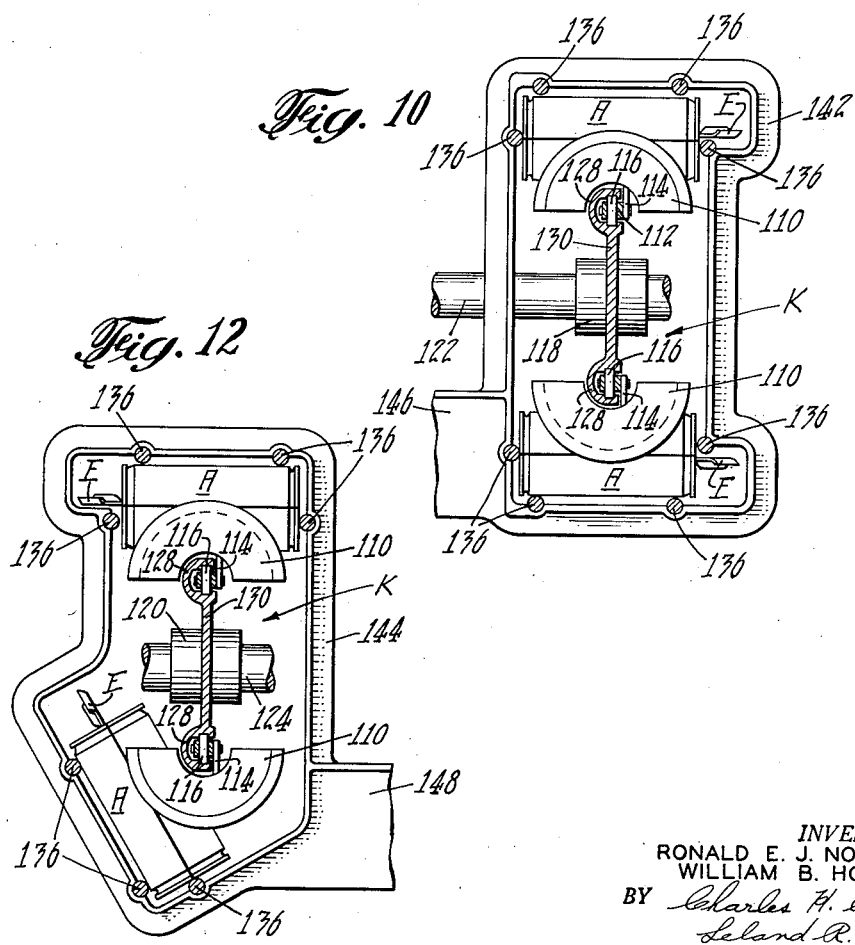
INVENTORS
RONALD E. J. NORDQUIST
WILLIAM B. HOMMEL
BY Charles H. Erne
Leland R. McCann
George W. Reiber
ATTORNEYS

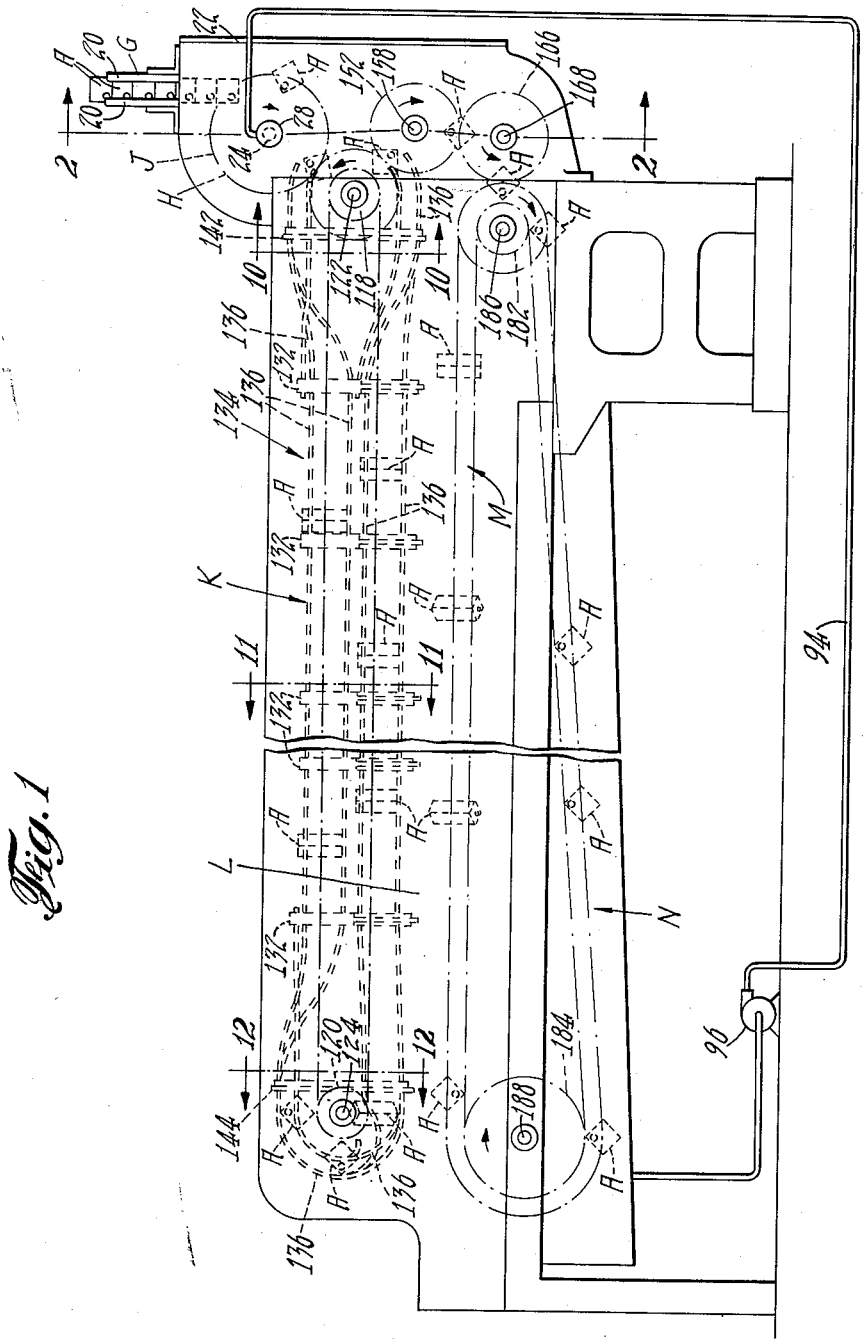

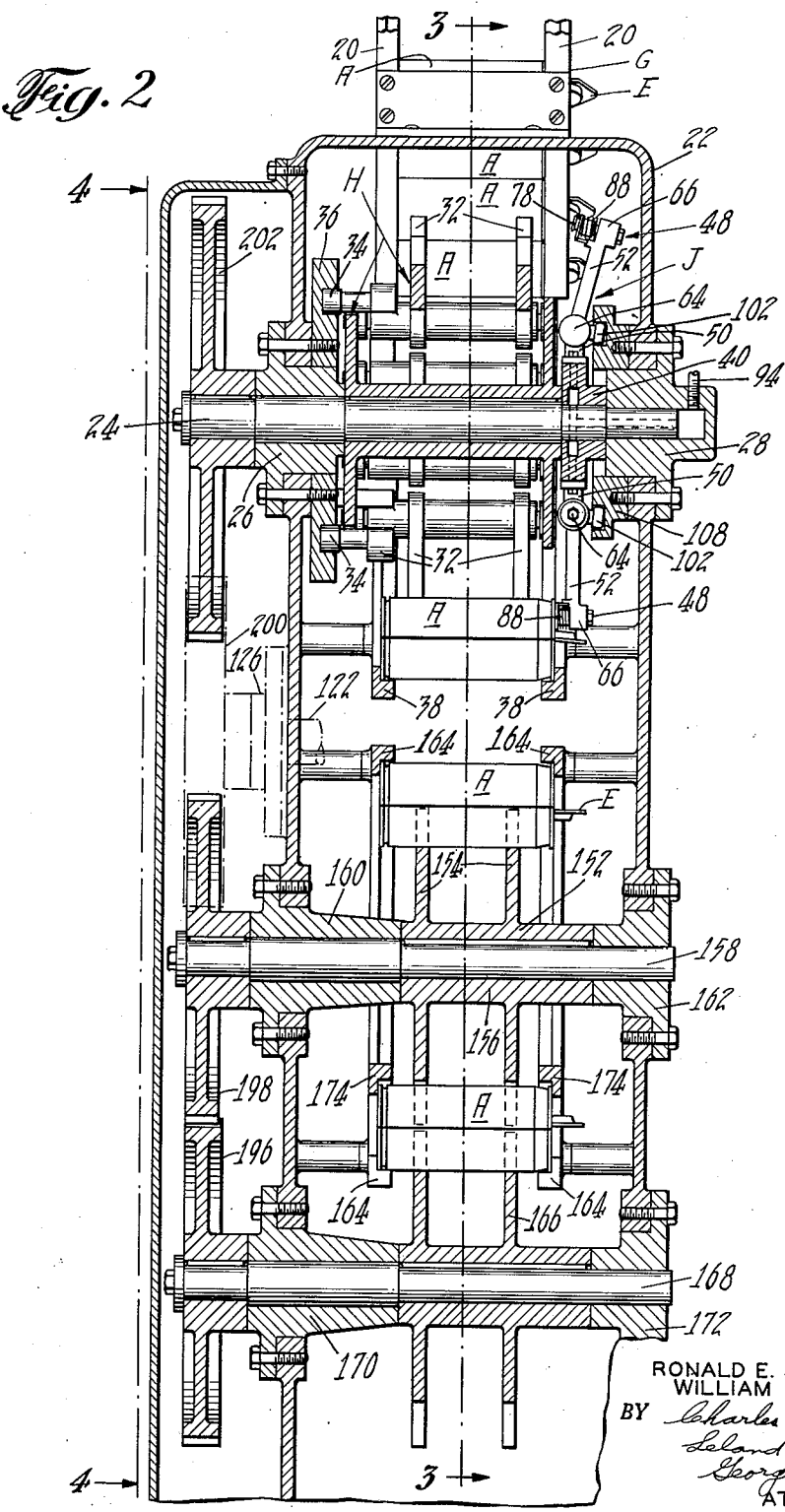

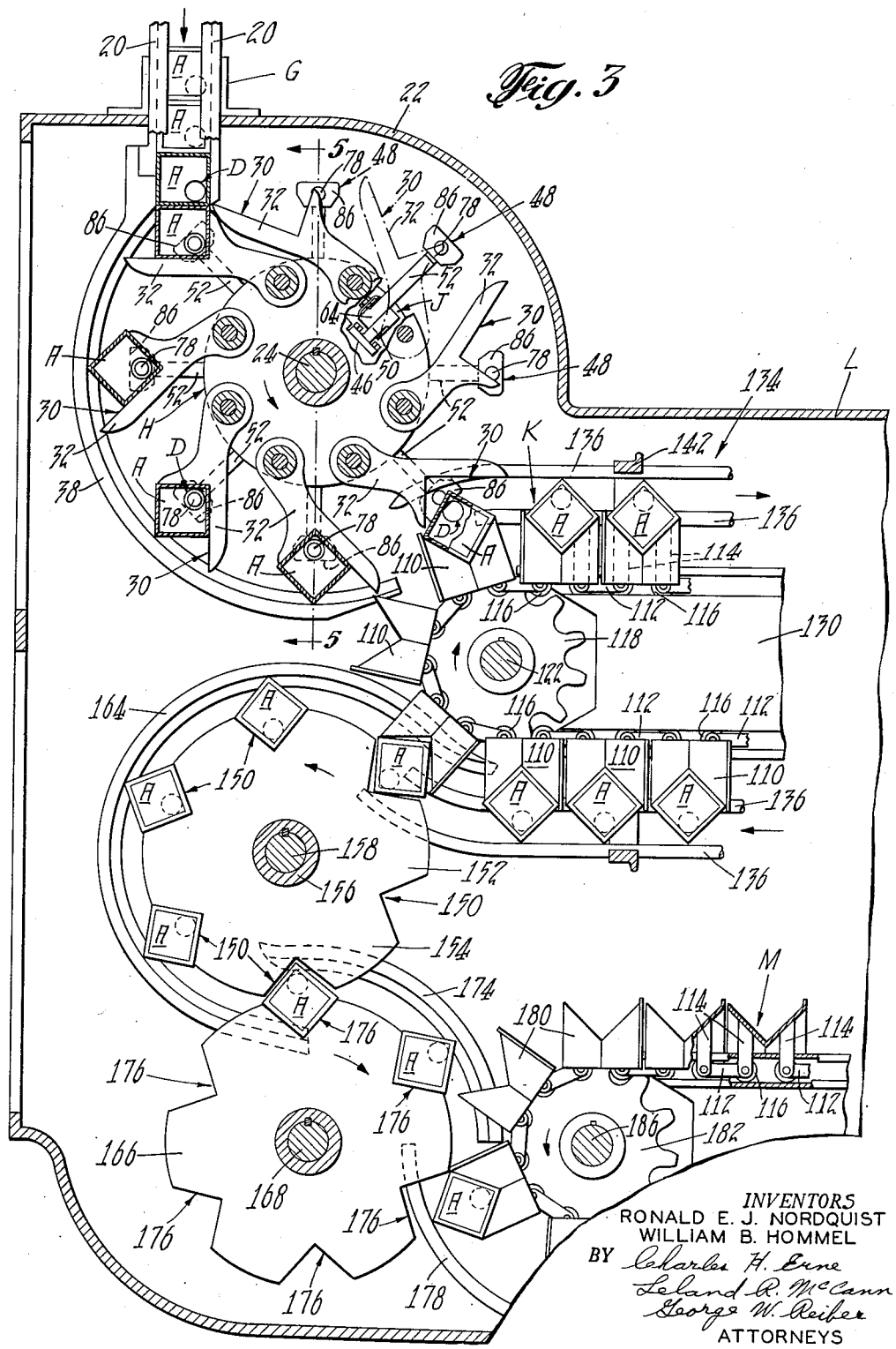

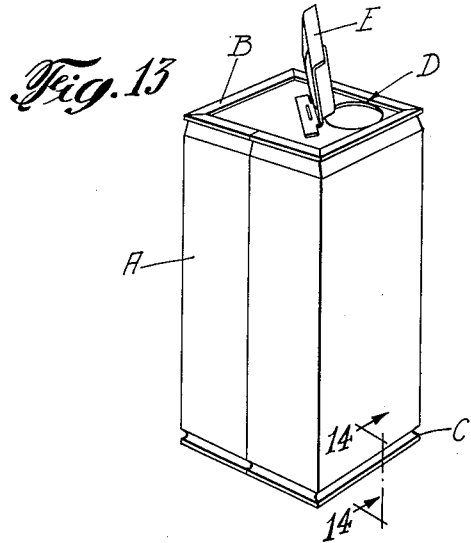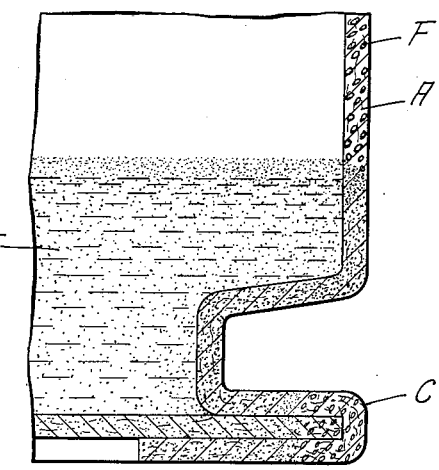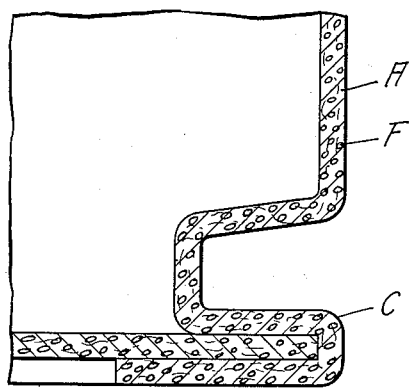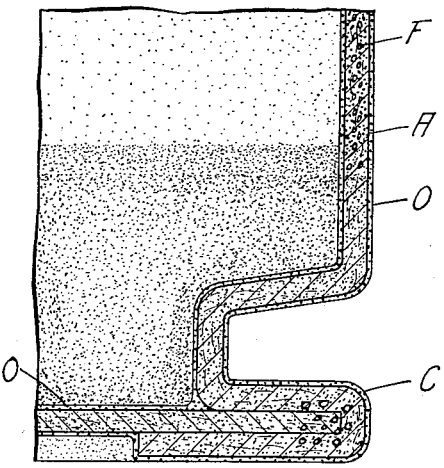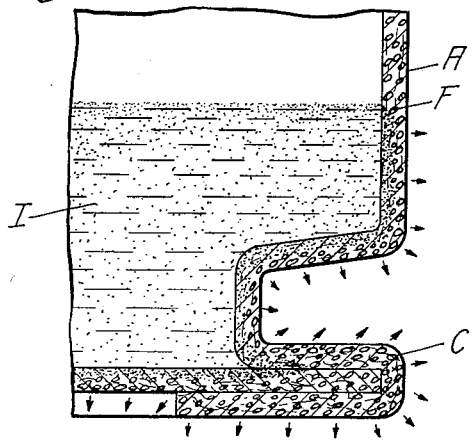

United States Patent Office 2,757,634
Patented Aug. 7, 1956

2,757,634

CONTAINER COATING MACHINE

Ronald E. J. Nordquist, Maplewood, N. J., and William B. Hommel, Gurnee, Ill., assignors to American Can Company, New York, N. Y., a corporation of New Jersey Application October 30, 1953, Serial No. 389,323

10 Claims. (Cl. 118—3)

The present invention relates to machines for applying a liquid-proofing material such as paraffin or the like to fibre containers used for packaging milk and other liquid products, and has particular reference to a machine in which those portions of the containers which are most vulnerable to leaks are subjected to a preliminary paraffining or other coating treatment prior to the general application of paraffin to all surfaces of the containers, in order to obtain deeper penetration of the paraffin where it is most needed.

This is a companion application to copending application Serial Number 389,324, filed in the United States Patent Office on October 30, 1953 in the name of William B. Elam, for Liquid-proof Container and Method of Producing the Same.

In the manufacture of fibre milk containers of the type disclosed in United States Patent 2,085,979, issued to John M. Hothersall on July 6, 1937, a continuous liquid-proof surface coating is obtained by completely immersing each container in a bath of molten paraffin or subjecting it to other suitable coating operation.

When the finished container has been filled with milk, it has been found that rough handling such as dropping or bouncing it on its bottom end sometimes causes fracture of the surface coating of paraffin in the bottom region of the container and the milk is thereby given access to the unimpregnated interior fibres of the body stock. This causes a softening of the stock, and small leaks sometimes develop at these softened areas.

In order to overcome this condition, the present invention contemplates subjecting these vulnerable bottom portions of the containers to a preliminary or "preflushing" application of molten paraffin prior to the total immersion of the container in the paraffin bath. This preflushing paraffin is allowed to soak into the body stock with the result that the bottom portions of the finished containers are completely impregnated with paraffin while the other, non-vulnerable portions remain, as heretofore, only shallowly impregnated. Thus, should the surface coating at the bottom portion of the container become fractured, substantially no softening of the fibres will result and no leakage will occur. In addition to preventing softening of the fibres, the additional paraffin also mechanically strengthens or reinforces the bottoms of the containers.

The preflushing paraffin or other coating material is preferably applied to only one side of the fibrous body stock. The reason for this is that as the paraffin penetrates the somewhat porous stock, it drives before it all the residual or occluded air which is normally present in the interstices between the fibers of the stock. It has been found that when the paraffin is simultaneously applied to both sides of the stock, this residual air is forced to the interior of the stock from both sides and becomes entrapped therein. This entrapped air then acts as a barrier to prevent or impede complete paraffin impregnation of the interior fibres and may result in a dry layer within the stock. When however, preflushing paraffin is applied from only one side as it is in the present machine, the air is not entrapped within the stock but is driven out through the opposite side as the paraffin penetration progresses and substantially complete impregnation results.

An object of the invention, therefore, is the provision of a container coating machine wherein selected portions of the container are subjected to a preflushing treatment which results in greater paraffin or other coating material impregnation of the selected portions than of the remainder of the container.

Another object is the provision of a container paraffining machine wherein the paraffin is unequally distributed within the fibrous stock of the containers in such a manner as to reinforce the weakest areas and thus produce the strongest possible containers commensurate with the total consumption of paraffin.

Still another object is to provide a container coating machine wherein the containers, while undergoing a preliminary localized coating treatment, are disposed within the main heated coating chamber in order to preheat the fibrous stock and thus condition it for the subsequent main application of paraffin or other coating material.

A further object is the provision of a fibre container paraffining machine having a preliminary treating or preflushing section in which molten paraffin is applied to only one side of the fibrous stock in order to prevent entrapment of the residual air within the interstices between the fibres.

Numerous other objects and advantages of the invention will be apparent as it is better understood from the following description, which, taken in connection with the accompanying drawings, discloses a preferred embodiment thereof.

Referring to the drawings:

Figure 1 is a schematic side elevational view of a machine embodying the instant invention, parts being broken away;

Fig. 2 is an enlarged vertical section taken substantially along the line 2—2 in Fig. 1, parts being broken away;

Fig. 3 is a vertical section taken substantially along the line 3—3 in Fig. 2, parts being broken away;

Fig. 4 is a reduced scale side elevation taken substantially along the line 4—4 in Fig. 2, and showing the train of gears for driving the various transfer devices of the coating section of the machine, the cover plate being removed and other parts being broken away;

Fig. 5 is an enlarged section taken substantially along the line 5—5 in Fig. 3 but showing only the turret for injecting the preflushing paraffin, the other parts being omitted or broken away;

Fig. 6 is a section taken substantially along the line 6—6 in Fig. 5, showing only one injecting head, the other parts being omitted;

Fig. 7 is a view taken substantially along the line 7—7 in Fig. 6 showing the injecting valve in open position;

Fig. 8 is a view similar to Fig. 7 but showing the injecting valve in closed position;

Fig. 9 is a view taken substantially along the line 9—9 in Fig. 5 but showing only the cam for oscillating the injecting heads, the other parts being omitted;

Figs. 10 to 12 inclusive, are enlarged vertical sectional views taken substantially along the respective lines 10—10, 11—11, and 12—12 in Fig. 1;

Fig. 13 is a perspective view of a fibre container of the type adapted to be coated in the machine of the instant invention; and Figs. 14 to 17 inclusive, are enlarged fragmentary sectional views taken substantially along a plane indicated by the lines 14—14 in Fig. 13, illustrating successive stages in the process of applying the liquid-proofing material to the container; Fig. 14 showing the condition of the fibre stock prior to the application of the coating material; Figs. 15 and 16 showing its condition during and at the completion of the preflushing operation respectively; and Fig. 17 showing the condition which obtains in the finished container after preflushing and after the main coating operation.

As a preferred or exemplary embodiment of the instant invention, the drawings illustrate a machine which is an improvement upon and embodies many features of the machine disclosed in the John M. Hothersall et al. United States Patent 2,343,906, issued March 14, 1944, and entitled "Coating Machine."

The containers A (Fig. 13) to be coated include top and bottom end seams B, C, a filling and dispensing opening D and a hinged sealing plug E. As seen in Fig. 14, the fibre stock of the container usually contains a certain amount of residual or occluded air F which is present in the interstices between the fibres.

The containers A are received in the machine in predetermined horizontal and oriented position in a vertical magazine G (Figs. 1, 2 and 3) and are removed individually from the bottom of the magazine by a rotary transfer turret H. While each container is under the control of the turret H and in horizontal position, a predetermined volume of molten preflushing paraffin I (see Fig. 15) is injected into it through the opening D by a preflushing turret J (Fig. 2) which is associated with the transfer turret H. The thus preflushed containers A are then fed onto a preflushing conveyor K which is disposed in and extends substantially the full length of a main heated coating chamber L of the machine. The containers are fed by and along both the upper and lower flights of the preflushing conveyor K in upright position in order to give the preflushing paraffin time to soak into and impregnate the vulnerable bottom portions of the containers.

After removal from the preflushing conveyor K, the containers are transferred to a main coating conveyor M, the lower flight of which first completely immerses them in and conveys them through a bath of molten paraffin contained in a reservoir N. While the containers A are in this paraffin bath, the excess preflushing paraffin mixes with the paraffin of the bath. After their immersion, the containers A are transferred to the upper flight of the coating conveyor M where they are inverted and drained of all excess paraffin. After draining, the containers are chilled to set or harden the paraffin and are discharged from the machine. Since details of the chilling section of the machine and of the main coating conveyor M and its associated parts are clearly disclosed in the John M. Hothersall et al. Patent 2,343,906, it has not been thought necessary to include them in this description of the machine.

As shown in Figs. 1, 2 and 3, the magazine G is formed with a plurality of upright guide bars 20 which are secured to a housing 22 which encloses the whole heated coating chamber L and forms a part of the main frame of the machine. The containers A are received horizontally in the magazine in uniform predetermined oriented position (Fig. 1), with their plugs E in open position and extending substantially at right angles to the tops of the containers, in which predetermined open position the plugs remain during the whole of the container travel through the coating section of the machine. The containers are removed individually and successively from the bottom of the magazine by a rotary transfer turret H. This transfer turret H is mounted for rotation on a horizontal shaft 24 journaled in bearings 26, 28 which are secured to the housing 22, and includes a multiplicity of container receiving pockets 30 (Fig. 3).

Each pocket 30 is formed by a pair of spaced arms 32, the movements of which are controlled by a cam roller 34 (see Fig. 2) which operates in a stationary cam 36 secured to the housing 22. The construction and operation of the transfer turret H is described in detail in Leif Brager United States Patent 2,570,198, issued October 9, 1951 on "Container Transfer Mechanism."

After each container has been received in a pocket 30 and removed from the magazine G, it is carried around through a circular path of travel, being maintained in the pocket 30 in a horizontal position by a pair of spaced, channeled guide rails 38 (Figs. 2 and 3). During this travel, the measured amount of molten preflushing paraffin I hereinbefore mentioned is injected into each container by the preflushing turret J (see Figs. 1, 2, 3, 5 and 6) which is mounted on one end of the shaft 24 and rotates with the transfer turret H.

The preflushing turret J includes a manifold or body member 40 (Figs. 2, 5 and 6) which is keyed to the shaft 24 and is provided with an internal annular groove 42 and a group of substantially radial bores 44 communicating therewith. The manifold 40 is also formed with a series of flat peripheral faces 46 on which are respectively mounted a plurality of injecting heads 48 (see Figs. 2, 3, 5 and 6) corresponding in number to and in substantial axial alignment with the transfer turret pockets 30.

Each injecting head 48 includes a tubular stationary arm 50 and a tubular swinging arm 52. The stationary arm 50 is bolted to a manifold face 46 and is provided at its outer end with an annular groove 54. The swinging arm 52 is formed at its inner end with a mating annular groove 56 and is swingably mounted on a bearing 58 formed integral with the stationary arm 50. A bolt 60 and a spring washer 62 maintain the two arms in tight contact to form a non-leaking swing joint, generally designated by the numeral 64.

At its outer end, the swinging arm 52 is provided with a normally closed valve 66 (see also Figs. 7 and 8). This valve 66 comprises a hollow barrel or body 68, one end 70 of which is reduced in diameter and fits snugly into a transverse bore 72 formed in the arm 52. An opening 74 in the barrel 68 provides for communication between the bore in the tubular arm 52 and the interior of the barrel 68. The barrel is held against movement within the bore 72 by means of a locking nut 76. The barrel 68 is closed at its front end by an integral flanged web 78 and at its rear end by a plug 80 and is provided with a number of jetting orifices 82 which normally are covered (see Fig. 8) by a slidable sleeve 84, the forward movement of which is limited by the flanged portion of the web 78. A flat plate 86 is welded or otherwise secured to the sleeve 84 and a coil spring 88, which maintains the sleeve in closing position, is confined between the plate 86 and the outer end of the arm 52. Two legs 90 (see Figs. 5, 7 and 8), formed integral with the plate 86, straddle a lug 92 formed in the arm 52 to prevent rotary movement of the plate 86 and sleeve 84 around the barrel 68.

Molten paraffin is fed to the injecting heads 48 from any suitable source of supply through a pipe 94 (Fig. 5) which may be heated in any suitable manner (not shown) to maintain the paraffin in a flowable state. In the instant embodiment of the invention, this molten paraffin is supplied from the main paraffin tank N by a pump 96 (Fig. 1). After leaving the supply pipe 94, the paraffin flows through a longitudinal bore 98 and a transverse bore 100 formed in the horizontal shaft 24 and is received in the manifold 40 which distributes it to the various injecting heads 48. The coating chamber L in which the preflushing turret J is disposed is of course heated to a temperature high enough to maintain the paraffin at proper temperature in its molten condition.

As each container A begins its circular movement with the turret H the swinging arm 52 of the injecting head 48 associated with the pocket 30 in which the container is carried is quickly swung from its retracted position (as shown by the upper arm 52 in Fig. 5) to its forward position (as shown by the lower arm 52 in Fig. 5) to project the forward end of the valve 66 through the container opening D and into the interior of the container. This movement is brought about by a cam roller 102 which is mounted on a pin 104 formed integral with the inner end of the swinging arm 52. The cam roller 102 operates in a cam groove 106 of a stationary face cam 108 (see Figs. 2, 5 and 9) and swings the arm 52 forward when it enters the high portion of maximum radius of the cam groove 106 at the position indicated by "open" on Fig. 9.

As the valve 66 is projected into the dispensing opening of the container, the flat plate 86 engages against the top end of the container and the forward movement of the sleeve 84 is thus halted before the forward movement of the valve barrel 68 ceases, with the result that the jetting orifices 82 are uncovered, thus permitting molten paraffin to flow into the container. It will be seen that if for any reason a container is not present in the turret pocket 30 the valve 66 will not be opened, thus providing an automatic "no-container, no-paraffin" arrangement.

The valve 66 remains open until the cam roller 102 leaves the high portion of the cam groove at the position marked "closed" in Fig. 9, thereby swinging the arm 52 back to its retracted position. This occurs just before the container is discharged from the transfer turret H. During the time the valve 66 is open, a predetermined volume of paraffin I is injected into the containers, this volume being in excess of that necessary to impregnate the bottom region of the container and being determined primarily by the shape of the cam groove 106 and the size and number of the orifices 82. The volume is preferably sufficient to fill the lower one half inch of the container when it is in upright position (see Fig. 15).

After the preflushing paraffin has been injected into the containers A, they are discharged from the transfer turret H onto the endless preflushing conveyor K which extends for nearly the full length of the machine and is positioned in the heated coating chamber L above the main coating conveyor M. The conveyor K (see Figs. 1, 3, 10, 11 and 12) comprises a plurality of V-shaped buckets 110 which, transversely of the conveyor, are semi-circular in cross-section and are connected by means of links 112 which are secured to lugs 114 which extend from the bottom of the buckets 110 and carry anti-friction rollers 116. The conveyor K operates around a pair of sprockets 118, 120 which are mounted on cross-shafts 122, 124 journaled in suitable bearings secured to the main frame of the machine. A portion of the cross-shaft 122 and one of its bearings 126 is shown in dot and dash lines in Fig. 2.

Between the sprockets 118, 120, the rollers operate in tracks 128 formed in an elongated flat supporting web 130 which is bolted at spaced intervals to brackets 132 secured to the main frame housing 22 of the machine (see Fig. 11).

During their travel along the conveyor K, the containers A are controlled by a guide 134 comprising a group of spaced guide bars 136 which parallel the conveyor and are positioned to engage the containers adjacent their ends. Intermediate the ends of the conveyor these bars 136 are secured to upper and lower extensions 138, 140, respectively, of the brackets 132 (see Fig. 11), while their end portions are held by brackets 142, 144 disposed adjacent the sprockets 118, 120, respectively (see Figs. 1, 10 and 12). Brackets 142, 144 are provided with lateral legs 146, 148 which are secured to the main frame of the machine.

The containers are received in the buckets 110 in the upper flight of conveyor K while still in horizontal position but soon thereafter are twisted or rotated a quarter of a turn by the guide bars 136 into upright position in order to enable the preflushing paraffin to flow to their bottom ends and soak into and impregnate the fibre stock. Fig. 15 shows the preflushing paraffin I soaking into the fibres and driving the residual or occluded air F ahead of it as a container A travels along the preflushing conveyor. Shortly before reaching the far end of the conveyor K, the guide bars 136 twist the containers back into horizontal position to enable them to pass around the sprocket 120 and then return them to upright position for their travel back to the feed-in end of the machine along the lower flight of the conveyor.

The latter uprighting of the containers preferably starts while the containers are still traveling around the sprocket 120 (see Figs. 1 and 12) in order to gain soaking time on the return flight and to prevent the molten paraffin in the containers from spilling out through the corner pouring opening D which would otherwise be turned into the lowermost corner position as the containers are carried around the sprocket 120.

The twisting of the containers in the buckets 110 is made possible by the semi-circular contour of the buckets which allows the containers to slide smoothly around the V-shaped bucket walls. The various positions of the containers as they travel in the conveyor K may be clearly seen by referring to Figs. 1, 10, 11 and 12.

The length of the conveyor K and its speed of travel are such that the paraffin impregnation is substantially complete by the time the containers finish their run along the lower conveyor flight. As seen in Fig. 16, with the possible exception of a small amount still remaining in the outer extremities of the bottom seam C, substantially all of the residual air F has been removed from the bottom portion of a container A at the completion of the preflushing or presoaking stage.

Just before the containers in the lower flight of the conveyor K reach the sprocket 118, the rails or guide bars 136 again twist them into horizontal position and they are discharged into pockets 150 of a second transfer turret 152 disposed and spaced beneath transfer turret H. Transfer turret 152 is composed of a pair of spaced discs 154 carried by a hub 156 which is keyed to a cross-shaft 158 journaled in bearings 160, 162 bolted to the housing 22.

The containers are held in the turret pockets 150 by a pair of spaced, circular channel guides 164 and are carried around to the bottom of the turret 152 and transferred to a third transfer turret 166 (see Figs. 1 to 3) similar in construction to the turret 152, and which is keyed to a cross-shaft 168 journaled in bearings 170, 172. Suitable arcuate channeled guides 174 maintain the containers in pockets 176 of the turret 166 until they are stripped therefrom by guide rails 178 and transferred to the lower flight of the main coating conveyor M (see Figs. 1 and 3) which completely immerses them in a bath of molten paraffin contained in the reservoir N. Conveyor M is similar in construction to the preflushing conveyor K, being provided with V-shaped container receiving buckets 180 and operating around a pair of sprockets 182, 184 which are keyed to cross-shafts 186, 188, respectively.

By the time the containers A reach the conveyor M, they have become thoroughly preheated because of their travel through the heated coating chamber L during the preflushing treatment. As a result of this preheating treatment, the residual air F in the non-preflushed portions of the container walls expands and some of it escapes from the fibrous stock, with the result that the stock absorbs more paraffin from the reservoir N than it otherwise would. During the immersion of the containers in the bath the excess molten preflushing paraffin I within the containers mixes with the paraffin from the bath as it flows into and fills their interiors. Thus, when the containers pass around the sprocket 184 and are removed from the bath and brought into inverted position on the upper flight of the conveyor M, the excess preflushing paraffin drains out along with the paraffin from the coating bath into the reservoir N.

After draining, the containers are conveyed into a chilling chamber, not shown, where the paraffin is hardened to form a continuous liquid-proof surface coating O (see Fig. 17) on all parts of the container. Details of construction and operation of the main coating conveyor M and of the chilling section of the machine may be obtained by referring to the previously mentioned John M. Hothersall, et al. Patent 2,343,906.

It will be noted in Fig. 17, that in spite of the preheating, some residual air F has been entrapped in the fibre stock of that portion of the container which has not been subjected to the preflushing treatment. This is because paraffin has been applied simultaneously to both sides of the stock during immersion in the reservoir N. Since this occurs in a less vulnerable portion of the container, it is not objectionable. On the contrary, it results in a lowered overall consumption of paraffin, and thus may be deemed desirable from an economic standpoint.

It is of course necessary that the various turrets and conveyors of the illustrated machine be operated in timed relationship with each other. By referring to Fig. 4, it can be seen that the proper rotation of these parts is obtained from a main drive shaft 190 through a small spur gear 192, which drives a train of driving gears 194, 196, 198, 200 and 202 which are keyed to and rotate the shafts 186, 168, 158, 122 and 24 respectively, upon which the moving parts of the machine are mounted. It will also be understood that suitable liquid coating material other than paraffin may be employed within the scope of the invention.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for selectively applying a liquid-proofing material such as paraffin or the like to fibre containers to reenforce their bottom wall portions against leakage, the combination of means for advancing said containers in a continuous procession from a source of supply, preflushing means cooperating with said advancing means for initially applying said liquid-proofing material to one side only of said bottom portions during such advancement, means for continuing the advance of said containers along a predetermined path of travel in substantially upright position to enable said material to soak into and impregnate said bottom wall portions from said one side thereof and thus drive out the residual air in said bottom wall portions to thereby substantially completely impregnate the latter, and means for thereafter applying a final coating of said liquid-proofing material to all inner and outer wall portions of said containers.

2. In a machine for selectively applying liquid-proofing material such as paraffin or the like to fibre containers to reenforce their bottom wall portions against leakage, the combination of a heated chamber, a feed turret rotatable on a horizontal axis and having peripheral pockets therein for introducing said containers into said chamber while lying on their sides, a preflushing material injecting turret rotatable coaxially with said feed turret and disposed in the entrance end of said chamber, said injecting turret having a plurality of radially extending nozzles pivotally mounted thereon and disposed in horizontal registry with the open ends of containers carried in an arcuate path of travel by said feed turret pockets, means cooperating with said rotatable injecting turret for swinging said nozzles on their pivotal mountings into engagement with said container open ends for injecting a measured volume of liquid-proofing material into said containers, a conveyor in said heated chamber for receiving the preflushed containers from said feed turret and for advancing said containers along a predetermined path of travel within said chamber, fixed guide means cooperating with said conveyor for turning said preflushed containers into substantially upright position on said conveyor to enable said injected material to soak into and impregnate said bottom wall portions and thereby force the occluded air therefrom while at the same time subjecting said containers to the heat of said chamber to prepare them for a subsequent application of said liquid-proofing material, and means for thereafter immersing said containers in a bath of liquid-proofing material.

3. In a machine for selectively applying liquid proofing material such as molten paraffin or the like to fibre containers to reenforce their bottom wall portions against leakage, the combination of a heated chamber, a rotatable transfer turret for introducing a said container into said chamber, a rotatable injecting turret mounted coaxially with said transfer turret and having a movable injecting nozzle thereon for injecting a measured amount of liquid proofing material into an open end of said container, an endless conveyor extending for substantially the full length of said heated chamber for receiving said injected container from said transfer turret and for propelling said container along a predetermined path of travel within said chamber, guide means cooperating with said conveyor for maintaining said container in substantially upright position on the conveyor to enable said injected liquid proofing material to soak into and impregnate the bottom wall portion of said container while at the same time subjecting said container to the heat of said chamber to prepare it for a subsequent application of an overall coating of liquid proofing material, and means for thereafter applying said overall coating of liquid proofing material to all exposed interior and exterior wall portions of said container.

4. In a machine for selectively applying liquid proofing material such as molten paraffin or the like to fibre containers to reenforce their bottom wall portions against leakage of liquid contents, the combination of a heated chamber, a rotary turret for receiving and introducing said containers into said chamber, a rotary injecting turret mounted coaxially with said receiving turret and having a plurality of nozzles pivotally mounted thereon for injecting measured amounts of said molten proofing material into said containers, an endless conveyor disposed in the upper portion of said chamber for receiving said injected containers from said injecting turret and for advancing said containers along a predetermined path of travel within said chamber, container guide means cooperating with said conveyor for holding the containers thereon in substantiallly upright position to enable said injected liquid-proofing material to soak into and impregnate said lower wall portions of said containers while at the same time subjecting said containers to the heat of said chamber to prepare them for a subsequent application of a further coating of liquid proofing material, and a second endless conveyor disposed below said first mentioned endless conveyor for receiving and thereafter immersing said impregnated containers in a bath of liquid proofing material to entirely surface coat the inner and outer wall portions thereof.

5. In a machine for selectively applying liquid proofing material such as paraffin or the like to fibre containers to reenforce their bottom wall portions against leakage of their liquid contents, the combination of a housing for enclosing a heated chamber, means for delivering said containers into said housing comprising a rotary transfer turret disposed at the entrance end of said chamber and having peripheral pockets thereon for receiving said containers from a source of supply, a rotary preflushing turret mounted coaxially with said transfer turret and having pivotally mounted nozzles thereon for injecting measured amounts of liquid proofing material into the open ends of said containers while they are carried in an arcuate path of travel by the pockets of said rotary transfer turret, an endless conveyor having spaced pockets thereon for receiving said preflushed containers from the pockets of said transfer turret and for propelling them along a predetermined path of travel within said heated chamber in substantially upright position to enable said injected proofing material to soak into and impregnate the bottom wall portions of said containers, and means for thereafter applying liquid proofing material to the remaining wall portions of said containers to obtain a surface coating of said proofing material on all inner and outer wall portions of said containers.

6. In a machine for selectively applying liquid proofing material such as paraffin or the like to fibre containers to reenforce their lower wall portions against leakage, the combination of an elongated heated chamber, means for delivering said containers into the entrance end of said chamber, a rotatable transfer turret having peripheral pockets therein disposed at said chamber entrance end for receiving and advancing said delivered containers, a rotatable preflushing turret mounted coaxially with said transfer turret and having movable nozzles thereon for injecting measured amounts of liquid proofing material into the open ends of said containers while they are carried by said transfer turret, an endless conveyor disposed within and extending longitudinally of said chamber, said conveyor having spaced means thereon for receiving said containers from said transfer means and for advancing them to the opposite end of said chamber and thereafter returning them to the entrance end of said chamber, means cooperating with said conveyor for maintaining said containers in substantially upright position for the major portion of their travel with said conveyor to enable said injected liquid proofing material to soak into and impregnate the lower wall portions of said containers, and a second endless conveyor disposed within said chamber below said first endless conveyor for receiving and immersing the heated and impregnated containers in a bath of liquid proofing material to apply a final surface coating of said material on all interior and exterior wall portions of said containers including the preflushed and impregnated portions thereof.

7. In a machine for selectively applying liquid proofing material such as paraffin or the like to fibre containers to produce containers having their bottom portions reenforced against leakage, the combination of a heated chamber, means for delivering said containers into said chamber, a rotary transfer turret for receiving said containers from said delivery means, a rotary preflushing turret associated with said transfer turret, said preflushing turret comprising a plurality of swinging arms having their free ends insertable into said containers for injecting measured amounts of liquid proofing material into said containers, an endless conveyor extending for substantially the full length of said heated chamber, said conveyor receiving said containers from said transfer turret and propelling them through said chamber in substantially upright position to enable said injected material to impregnate the bottom portions of said containers, and a second endless conveyor disposed adjacent said first conveyor for immersing said containers in a bath of liquid proofing material to apply a final surface coating of said material to said containers.

8. In machine for selectively applying liquid-proofing material such as paraffin or the like to fibre containers to produce containers having their bottom portions reenforced against leakage, the combination of a heated chamber, means for delivering said containers into said chamber, a rotary transfer turret for receiving said containers from said delivery means, a rotary preflushing turret associated with said transfer turret, said preflushing turret comprising a plurality of swinging arms having at their outer ends injecting valves insertable into said containers, each of said valves being normally closed but being provided with a movable element which is engageable against a portion of a said container to open said valve to thereby inject a measured volume of liquid-proofing material into a said container, an endless conveyor extending for substantially the full length of said heated chamber, said conveyor receiving said containers from said transfer turret and propelling them through said chamber in substantially upright position to enable said injected material to impregnate the bottom portions of said containers, and a second endless conveyor disposed adjacent said first conveyor for immersing said containers in a bath of liquid-proofing material to apply a final surface coating of said material to said containers.

9. A machine for selectively applying a liquid-proofing material such as molten paraffin or the like to fibre containers to reenforce their bottom wall portions against leakage of liquid contents due to sudden shocks, comprising means for advancing said fibre containers in a continuous procession from a source of supply thereof, means cooperating with said advancing means for injecting a predetermined measured volume of preflushing liquid-proofing material into the interiors of said containers, means for continuing the advance of said containers along a predetermined path of travel while maintained in substantially upright position to enable said injected material to soak into said bottom wall portions from the inside outwardly and thus expel the residual air from said bottom wall portions while substantially completely impregnating the latter with said material, and means for thereafter immersing said preflushed containers in a bath of liquid-proofing material to surface coat the entire inner and outer wall portions thereof.

10. A machine of the character specified in claim 9 wherein all of the recited means are disposed in an enclosed heated chamber.

References Cited in the file of this patent
UNITED STATES PATENTS

| | | |
|---|---|---|
| 2,174,514 | Hothersall | Oct. 3, 1939 |
| 2,257,740 | Goebel et al. | Oct. 7, 1941 |
| 2,343,906 | Hothersall et al. | Mar. 4, 1944 |
| 2,387,273 | Kronquest | Oct. 23, 1945 |
| 2,512,651 | Jacobs | June 27, 1950 |
| 2,632,918 | Bergstein | Mar. 31, 1953 |